(12) United States Patent
Martin (10) Patent No.: US 10,522,936 B2
(45) Date of Patent: Dec. 31, 2019

(54) OUTLET SAFETY COVER (71) Applicant: Robert Dale Martin, Checotah, OK (US)

(72) Inventor: Robert Dale Martin, Checotah, OK (US)

(*) Notice: Subject to any disclaimer, the term of this patent is extended or adjusted under 35 U.S.C. 154(b) by 0 days.

(21) Appl. No.: 15/595,892

(22) Filed: May 15, 2017

(65) Prior Publication Data

US 2018/0331456 A1 Nov. 15, 2018

(51) Int. Cl.
H01R 13/447 (2006.01)
H01R 13/443 (2006.01)
H02G 3/14 (2006.01)
H01R 24/76 (2011.01)

(52) U.S. Cl.
CPC .......... H01R 13/447 (2013.01); H02G 3/14 (2013.01); H01R 13/443 (2013.01); H01R 24/76 (2013.01)

(58) Field of Classification Search
CPC .................. H01R 13/443; H01R 13/447
USPC ....... 439/148, 142, 135–138, 145, 149, 195; 220/241, 242; 174/66, 67
See application file for complete search history.

(56) References Cited

U.S. PATENT DOCUMENTS

| | | | | |
|---|---|---|---|---|
| 4,671,587 A | * | 6/1987 | Lerner | H01R 13/447 439/135 |
| 5,408,046 A | * | 4/1995 | Vandeventer | H01R 13/447 174/67 |
| 5,989,052 A | * | 11/1999 | Fields | H01R 13/447 439/144 |
| 9,553,437 B1 | * | 1/2017 | Martin | H02G 3/14 |

* cited by examiner

Primary Examiner — Amy Cohen Johnson
Assistant Examiner — Paul D Baillargeon (57) ABSTRACT An electrical outlet safety cover consisting of a cover plate and removable caps to cover and prevent access by children to underlying electrical outlet. The cover plate replaces a standard electrical cover plate on an electrical outlet and fastens to the electrical outlet with an attachment screw in the center of the safety cover. The rear side of the cover plate is provided with slot housings on the top sides and bottom on each electrical socket access opening into which legs, provided on the child-proof safety caps, insert as a means of fastening or removing the caps over the electrical outlet. A slot housing surrounds each slot to prevent the legs on the safety cap from inserting too far inward when inserting or removing the caps from the cover plate. The caps are sufficiently large to cover the attachment screw and to prevent choking by a child.

6 Claims, 9 Drawing Sheets

OUTLET SAFETY COVER

FIELD OF INVENTION

Outlet Safety Cover

Having a removable cap attached to slots in the rear side of an electrical outlet cover plate

BACKGROUND OF THE INVENTION

The present invention relates to an electrical outlet cover plate with removable cover caps that attach to the cover plate in order to cover electrical sockets provided on an electrical outlet and to prevent unwanted access to the electrical socket. Different devices have been created for preventing children from inserting objects into electrical sockets of electrical outlets and thus being electrocuted. Still other devices for addressing this problem are specially designed electrical outlets or electrical sockets. However, these require replacement of the electrical outlet which can be expensive. The present invention addresses this problem by providing a cover plate that fits over a standard electrical outlet and is provided with child proof removable caps that cover the electrical sockets. This device is economical, easily installed and effective in preventing access by children to the electrical sockets while allowing an adult to easily remove one or more of the caps to obtain access to the socket.

SUMMARY OF INVENTION

An apparatus device for electrical outlet cover plates that will attach to or retro fit most traditional electrical outlets and fits flush against an existing wall with a screw in the center of the cover plate. The cover plate contains socket openings as well as slot housings to lock the safety caps into place over the socket openings. Each safety cap has four locking legs that enter into slot housings and, when turned clockwise, will lock the safety caps into the cover plate. To remove the safety caps, place thumb on one side of the cap and a finger on the other side, press in on top of the cap, and while pressing on the cap turn counter-clockwise until locking leg reaches the wide end of the slot, then pull cap off from the cover plate.

DETAILED DESCRIPTION OF THE PREFERRED EMBODIMENT

Figure 1:
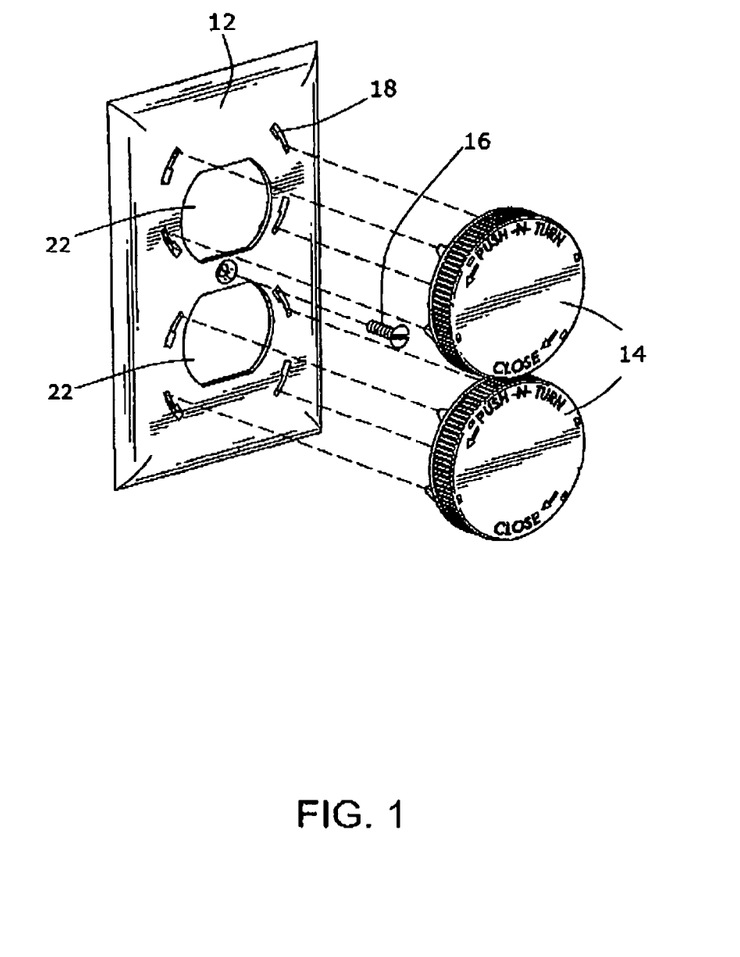
FIG. 1 depicts the overall assembly of the safety cover plate, safety caps, and fastener.

Referring to the drawings beginning with FIG. 1, there is an illustrated electrical outlet safety cover FIG. 1, 12 that is constructed in accordance with a preferred embodiment of the present invention. The safety cover plate FIG. 1, 12 is a rectangular shape containing traditional electrical outlet openings FIG. 1, 22, through which the female sockets of a traditional outlet are exposed into which the male end of traditional plugs fit. The cover FIG. 1, 12 fits over traditional electrical outlets, and includes a fastener hole FIG. 4, 16B for the screw FIG. 1, 16 to fit and seats into a traditional electrical outlet and mounts flush to the wall. There are four slot housing openings FIG. 1, 18 around each outlet opening FIG. 1, 22 into which the looking legs FIG. 2, 20 of each safety cap FIG. 3, 14 mount. In the top outlet opening FIG. 1, 22, two of the slot housings FIG. 1, 18 are located just above the outlet opening on the left and right side, and two slot housings sit on the left and right around the mid section of the top outlet opening. In the bottom outlet opening FIG. 1, 22, two of the slot housings are located just below the outlet opening on the left and right side, and two on the left and right in the mid section of the bottom outlet opening.

Figure 2:
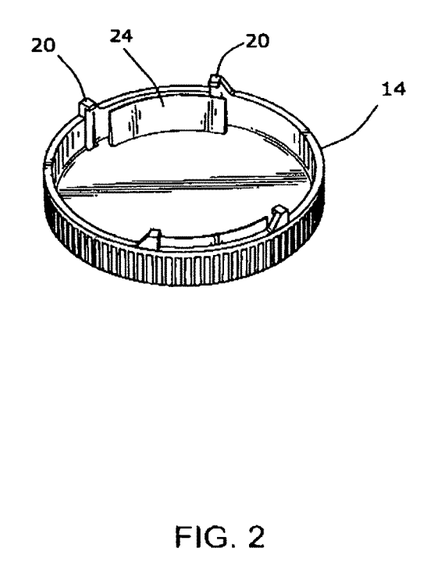
FIG. 2 illustrates the back view of the safety cap with legs and spring.
Figure 3:
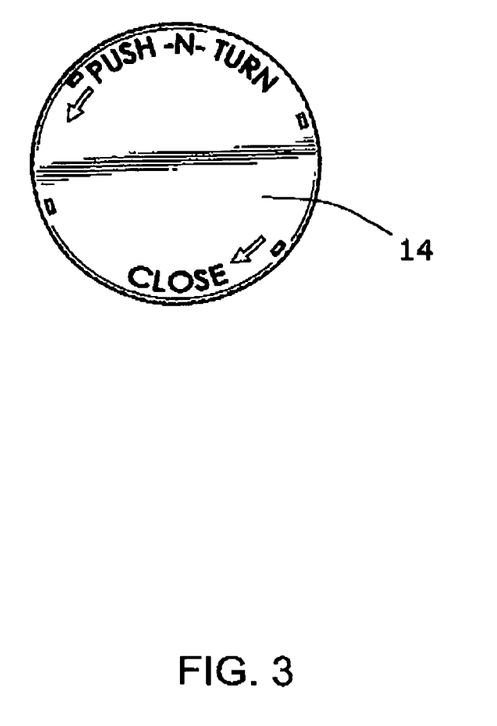
FIG. 3 shows the front view of the safety cap.
Figure 4:
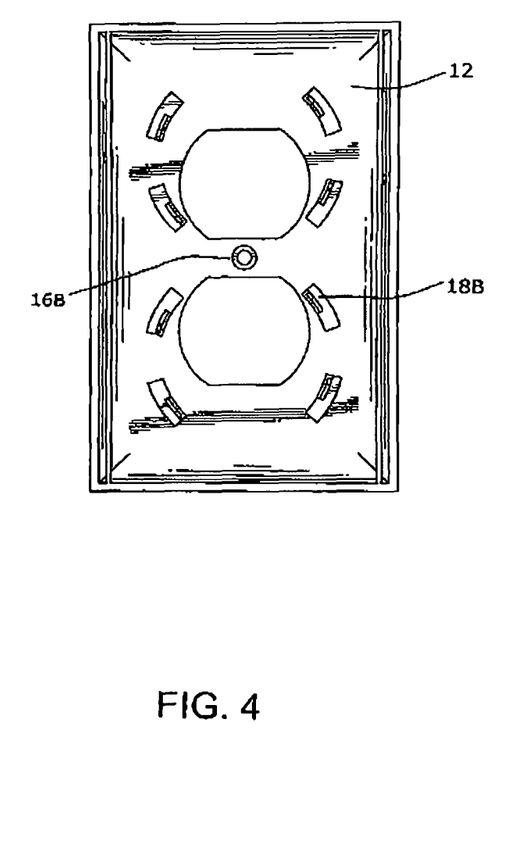
FIG. 4 displays the back view of the safety cover.
Figure 5:
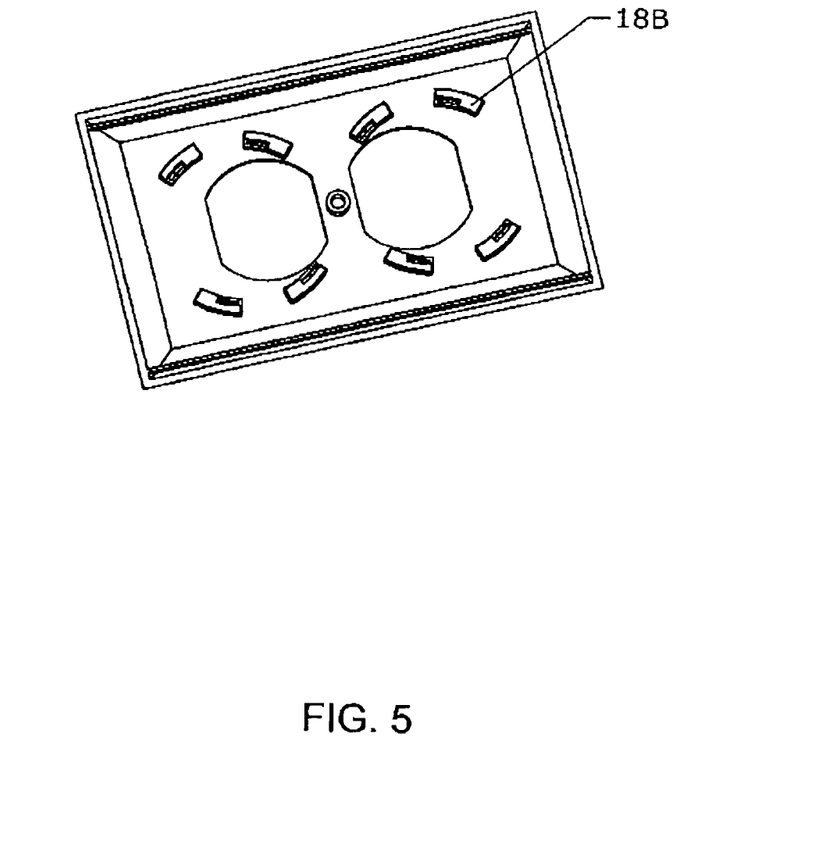
FIG. 5 reveals the back view of the safety cover place, highlighting a single slot housing FIG. 6 introduces the location of the "A" feature of the slot housing on the safety cover plate depicted at magnification in FIG. 7.
Figure 6:
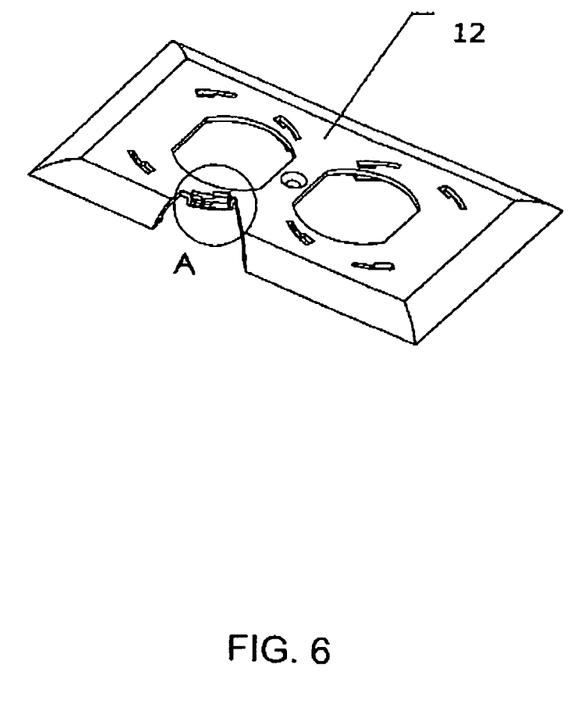
Figure 7:
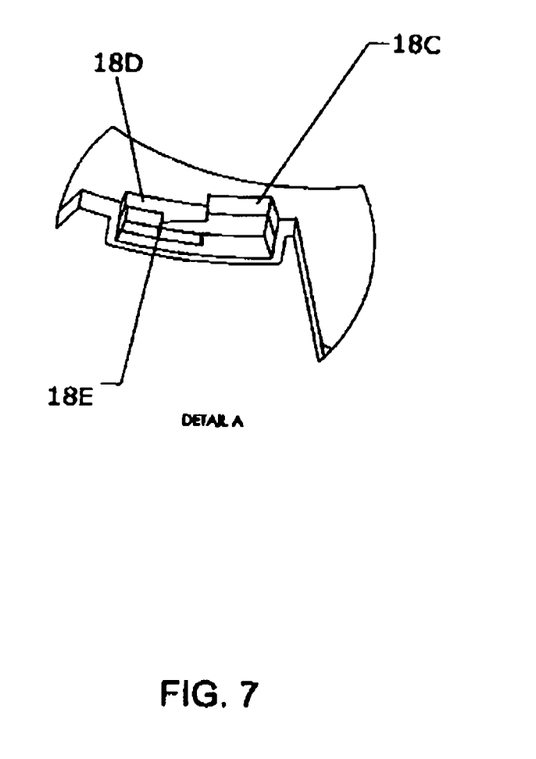
FIG. 7 is a magnification and cross-section of the slot housing ramp, and the wide and narrow ends of the locking mechanism.

Each safety cap FIG. 3, 14 has four legs FIG. 2, 20 and two springs FIG. 2, 24 on the back side to insert into the slot housings FIG. 5, 18B. These are designed in a manner similar to a mechanism provided on child-proof medicine bottles. When the safety cap legs FIG. 2, 20 are inserted into the slot housings FIG. 5, 18B, the legs are first inserted into the wider opening of the housing FIG. 7, 18C. When the legs FIG. 2, 20 are inserted, the cap is turned clockwise until the leg hooks FIG. 9, 20B lock into place inside the slot housing FIG. 5, 18B at the narrow end FIG. 7, 18D, confirming the lock position. The slot housings FIG. 5, 18B have a wider end FIG. 7, 18C to receive the legs FIG. 2, 20 of the safety cap, and the leg hooks FIG. 9, 20B travels up a ramp FIG. 5, 18E inside the slot housing, and then each slot housing narrows to the narrow end FIG. 7, 18D where the legs FIG. 2, 20 and the leg hooks FIG. 6, 20B lock into place. The springs FIG. 8, 24 on the back side of the safety cap FIG. 3, 14 ensure a snug fit inside the slot housing FIG. 5, 18B.

Figure 8:
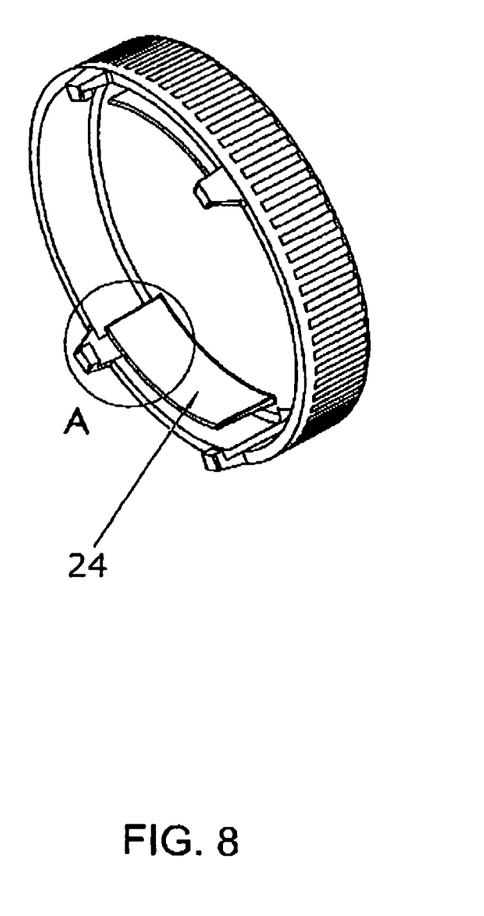
FIG. 8 shows the spring component of the locking mechanism, and introduces the "A" feature of the spring and a single leg and hook on the safety cap shown at magnification in FIG. 9 is a magnification of the spring and leg and hook devices of the locking mechanism.
Figure 9:
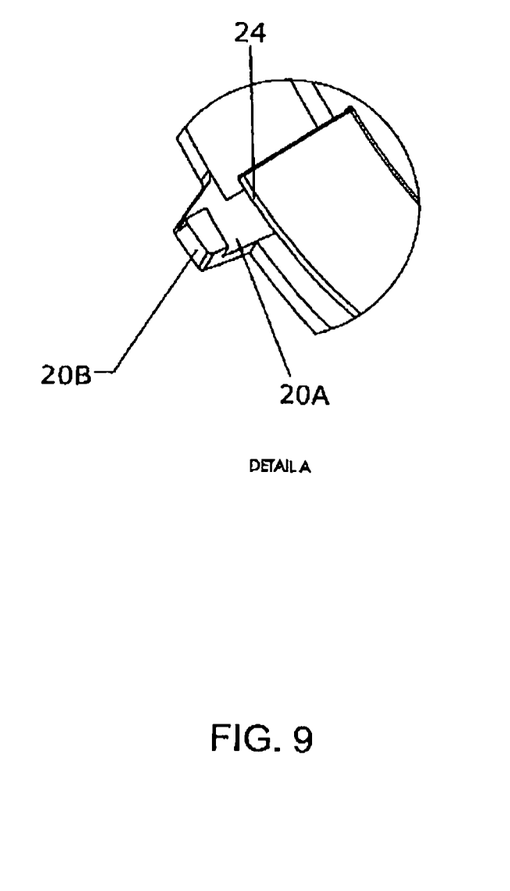

To remove a safety cap FIG. 3, 14 from the safety cover plate FIG. 1, 12, push in on top and the outside walls of the safety cap FIG. 3, 14 while simultaneously turning the cap counterclockwise, engaging the spring FIG. 8, 24 to release the leg hooks FIG. 9, 24B. The legs FIG. 2, 20 of the safety cap FIG. 3, 14 then travel back down the ramp FIG. 7, 18E inside the slot housings FIG. 5, 18B, from narrow end FIG. 7, 18D to wider end FIG. 7, 18C. Once the legs of the safety cap FIG. 2, 20 reach the wider end, the safety cap FIG. 1, 14 may be pulled free from the slot openings FIG. 1, 18 and away from the safety cover plate FIG. 1, 12. It is to be understood that each safety cap FIG. 1, 14 is independently attachable to and detachable from the safety cover plate FIG. 1, 12.

The invention claimed is:

1. A wall plate and cover system, comprising:
   A wall plate having:
      A socket space;
      A flat front face;
      A rear face opposite the front face; and
      A plurality of securing slots in the front face arranged around the socket space;

wherein a securing ramp protruding from the rear face is located at each of the plurality of securing slots;

A cover, the cover being a unitary structure, the cover having:
A plurality of securing legs extending from a bottom face of the cover; and
A spring member, the spring member being an arcuate wall projection extending from the bottom face at a position inward from the plurality of securing legs, and the spring member extending upwards from the bottom face towards the plurality of securing legs;

wherein in securing the cover to the wall plate the cover is positioned so that the plurality of securing legs enters the plurality of securing slots, whereby the cover is rotated when the securing legs are within the securing slots, and the securing legs engage the securing ramps, and the spring member secures the cover to the wall plate; and wherein to remove the cover from the wall plate the cover is gripped and pushed towards the front face of the wall plate, rotated in an opposite direction so that the plurality of the securing legs disengages from the securing ramps, whereby the cover can be pulled away from the wall plate.

2. The wall plate and cover system of claim 1, wherein there are four securing slots, four securing ramps, and four securing legs.

3. The wall plate and cover system of claim 1, wherein the wall plate has a recessed portion for attaching the wall plate to a wall, the recessed portion is located on the front face.

4. The wall plate and cover system of claim 3, wherein the recessed portion is shaped to accept a screw for attaching the plate to the wall.

5. The wall plate and covers system of claim 1, wherein each of the plurality of securing slots has a wide portion which accepts the securing legs as the legs are inserted into the slots, and a narrow portion which surrounds the legs when the cover is rotated into the secured position.

6. The wall plate and cover system of claim 1, wherein the securing legs have the leg hooks which travel over the securing ramps during rotation of the cover and snap into place when the cover reaches the secured position.

* * * * *